US008909587B2

(12) United States Patent
Alush et al.

(10) Patent No.: US 8,909,587 B2
(45) Date of Patent: Dec. 9, 2014

(54) SURVEY FEASIBILITY ESTIMATOR (75) Inventors: Royi Alush, Ramat Gan (IL); Dvir Babila, Petah Tikvah (IL); Shimon Golan, Haifa (IL); Frank Smadja, Haifa (IL); Tomer Weingarten, Petah Tikva (IL)

(73) Assignee: Toluna USA, Inc., Wilton, CT (US)

( * ) Notice: Subject to any disclaimer, the term of this patent is extended or adjusted under 35 U.S.C. 154(b) by 314 days.

(21) Appl. No.: 13/299,510

(22) Filed: Nov. 18, 2011

(65) Prior Publication Data

US 2013/0132328 A1 May 23, 2013

(51) Int. Cl.
*G06N 7/02* (2006.01)
*G06N 7/06* (2006.01)
*G06Q 30/02* (2012.01)

(52) U.S. Cl.
CPC ................................ *G06Q 30/0203* (2013.01)
USPC ............................................................ 706/52

(58) Field of Classification Search
CPC .............. G06Q 30/02; G06Q 30/0203; G06Q 30/0202; G06Q 30/0217; G06Q 30/0242; G06Q 30/0243; G06Q 30/0245; G06N 5/02; G06N 5/022; G06N 7/00; G06N 99/005
See application file for complete search history.

(56) References Cited

U.S. PATENT DOCUMENTS

| | | | | |
|---|---|---|---|---|
| 7,020,082 B2 * | 3/2006 | Bhagavath et al. | ........... | 370/230 |
| 7,571,110 B2 * | 8/2009 | Tarr et al. | ...................... | 705/7.32 |
| 8,095,589 B2 * | 1/2012 | Singh et al. | ................... | 709/201 |
| 8,275,648 B2 * | 9/2012 | Carrier et al. | ................ | 705/7.32 |
| 2002/0007303 A1 * | 1/2002 | Brookler et al. | ................ | 705/10 |
| 2002/0016727 A1 * | 2/2002 | Harrell et al. | ...................... | 705/7 |
| 2002/0123924 A1 * | 9/2002 | Cruz | ............................... | 705/10 |
| 2003/0078804 A1 * | 4/2003 | Morrel-Samuels | ............... | 705/1 |
| 2003/0101088 A1 | 5/2003 | Lohavichan | | |
| 2005/0027666 A1 * | 2/2005 | Beck et al. | ......................... | 707/1 |
| 2005/0065632 A1 * | 3/2005 | Douglis et al. | ................ | 700/200 |
| 2005/0283395 A1 * | 12/2005 | Lesandrini et al. | ............. | 705/10 |
| 2006/0029920 A1 * | 2/2006 | Bruno et al. | ................... | 434/323 |
| 2006/0111962 A1 * | 5/2006 | Holsinger | ........................ | 705/10 |
| 2009/0150217 A1 * | 6/2009 | Luff | ................................ | 705/10 |
| 2009/0187470 A1 * | 7/2009 | Smadja et al. | ................... | 705/10 |
| 2010/0114666 A1 * | 5/2010 | Brierley et al. | ................. | 705/10 |
| 2010/0138260 A1 * | 6/2010 | Smadja | ............................ | 705/7 |
| 2010/0228602 A1 * | 9/2010 | Gilvar et al. | .................... | 705/10 |
| 2010/0281313 A1 | 11/2010 | White et al. | | |
| 2011/0076663 A1 * | 3/2011 | Krallman et al. | ............. | 434/362 |
| 2011/0145056 A1 * | 6/2011 | Sullivan et al. | ............ | 705/14.41 |
| 2011/0231226 A1 * | 9/2011 | Golden | ........................ | 705/7.32 |

(Continued)

OTHER PUBLICATIONS http://www.classapps.com/SelectSurveyDocumentation.asp , "SelectSurvey.NET Training Manual", Feb. 24, 2010, pp. 1-28.*

(Continued)

*Primary Examiner* — Jeffrey A Gaffin
*Assistant Examiner* — Paulinho E Smith
(74) *Attorney, Agent, or Firm* — McCarter & English, LLP (57) ABSTRACT

The disclosure is directed to systems and methods for estimating the completion time of a web-based survey. The estimated completion time can be determined based on survey parameters associated with the web-based survey. The survey parameters can be based on characteristic values of the web-based survey associated with the survey parameters. The characteristic values of survey parameters can be used to estimate parameter completion times, from which an estimated survey completion time for the web-based survey may be determined. The disclosed systems and methods further permit assessments of survey feasibility.

13 Claims, 6 Drawing Sheets

(56) References Cited

U.S. PATENT DOCUMENTS

| | | | |
|---|---|---|---|
| 2012/0136696 A1* | 5/2012 | Smadja et al. | 705/7.32 |
| 2013/0046613 A1* | 2/2013 | Farahat et al. | 705/14.43 |
| 2013/0073502 A1* | 3/2013 | Golan et al. | 706/45 |
| 2013/0132328 A1* | 5/2013 | Alush et al. | 706/52 |
| 2013/0204665 A1* | 8/2013 | Carsanaro et al. | 705/7.32 |
| 2013/0226664 A1* | 8/2013 | Rinzler | 705/7.32 |

OTHER PUBLICATIONS

SuperSurvey (http://www.supersurvey.com/papers/supersurvey_white_paper_response_rates.pdf), "Online Survey Response Rates and Times—Background and Guidance for Industry", Oct. 13, 2011, pp. 1-6.*

Survey Monkey (http://s3.amazons.com/SurveyMonkeyFiles/SmartSurvey.pdf), "Smart Survey Design", May 19, 2011, pp. 1-35.*

Jeff Sauro, "How to Estimate a Survey Response Rate", www.measuringusability.com/blog/response-rate.php, pp. 1-2.*

Karen McCullagh, "How and Why to Research with Online Surveys", Nov. 19, 2009, http://www.academia.edu/1661550/How_and_why_to_research_with_online_surveys, pp. 1-.*

Extended European Search Report dated Feb. 14, 2013.

* cited by examiner

SURVEY FEASIBILITY ESTIMATOR

BACKGROUND

1. Technical Field

The present disclosure is directed to systems and methods for estimating survey completion feasibility and/or survey completion timeframes based on associated survey parameters.

2. Background Art

Organizations are typically interested in obtaining valuable customer insight to assist in development of products and/or services, determine whether customers are satisfied, test advertising concepts and/or website effectiveness, and the like. In some instances, organizations obtain valuable customer insight using surveys and/or other market research techniques. For example, online web-based surveys provide organizations with an efficient environment for quickly reaching their target audience. Web-based surveys can allow organizations to view survey results as they become available. For example, when a respondent completes a survey, the respondent's answers to the questions in the survey can be processed and/or viewed by the organization that solicited the feedback.

Survey hosting sites can provide a central location for survey distribution and can maintain a pool of respondents for responding to the surveys that are maintained at or coordinated by the site. Prior to issuing a survey, the organization interested in obtaining customer insight may wish to limit certain parameters for the survey to be issued in order to obtain a more valuable result. Generally, the organization may wish to limit the survey participation by a target country, a desired number of completes and/or a list of targets. The survey participation may further be limited or guided by generic demographic attributes of the desired survey participants. For example, an organization may be interested in obtaining a specific number of completes to a survey based on survey participant location, age, sex, etc. In addition, the organization may wish to more specifically limit the parameters for survey participants, for example 20% men and 80% women. Such survey parameter limitations may provide some benefit to organizations interested in determining, for example, product appeal in a specific location, to a specific age group and/or to a specific sex.

When organizations create or establish applicable survey parameters for survey participants, it would be highly desirable for a survey hosting site to be able to determine whether it is feasible for the survey hosting site to create such survey and obtain the results based on the specified parameters. It would be also be highly desirable for a survey hosting site to be able to generate an estimate as to the completion rate of a given survey based on the survey parameters. For example, an organization may create survey parameters which are so limited that the pool of respondents available to or known by the survey hosting site will be insufficient to obtain the requested responses to the survey within a desired timeframe or, in the worst case, at all.

If a survey hosting site were able to detect and/or project the non-feasibility of performing a survey based on proposed survey parameters (either within a prescribed timeframe or over any timeframe), the survey hosting site may be able to report the non-feasibility to the organization, which in turn may reduce the limitations of the survey parameters to create a feasible survey or take other corrective action.

In addition to maintaining a pool of respondents, survey hosting sites also typically provide a central location for maintaining and distributing surveys. Although a survey hosting site may maintain a large number of surveys, it is generally the case that only a specific amount of surveys may be active at one time. Indeed, by limiting the number of active surveys at a given point in time, the survey hosting site may be better able to ensure that surveys initially created obtain their required responses based on the specified parameters prior to issuing further surveys, thereby placing primary focus on those surveys issued first until all of the specified parameters and completes are obtained. The maximum number of surveys that may be effectively maintained in an active state at one time may be referred to as a "saturation level".

In view of the foregoing, a need exists for an ability to estimate survey feasibility, i.e., a system or method that would effectively estimate the feasibility of a given survey based on certain parameters of the survey and/or estimate the projected completion rate of the given survey. A need also exists for system(s) and/or method(s) for effectively identifying and/or estimating saturation levels. Further, a need exists for system(s) and/or method(s) that are effective to control, delay and/or refrain from the initiation of one or more new surveys that may be held in a queue based on such estimated saturation levels. Still further, a need exists for system(s) and/or method(s) that are adapted to examine the queue in a first in, first out ("FIFO") order and, if the amount of active surveys is below the saturation level, activate one or more new surveys so as to operate at or in close proximity to the saturation level.

These and other needs are addressed by the systems and methods of the present disclosure.

SUMMARY

In one aspect, systems and methods for estimating the completion rate of web-based surveys are disclosed. The disclosed system/method generally includes determining parameter completion times for survey parameters associated with one or more web-based surveys based on characteristic values of each respective web-based survey associated with the survey parameters. The system/method also typically includes determining an estimated survey completion time based on the parameter completion times. The estimated survey completion time is generally equal to the longest parameter completion time. In exemplary embodiments, the survey parameters may be or include generic demographic attributes and/or a desired number of completions. In exemplary implementations, the disclosed characteristic values of a web-based survey may include an average completion rate for an average survey in a given country, an active panel for the country for a predefined period of time, and a matching panel.

In another aspect, the disclosed system/method for estimating the completion rate of one or more web-based surveys may further include functionality for estimating the feasibility of completing a web-based survey, e.g., within a prescribed and/or commercially reasonable period of time. The feasibility-related functionality may advantageously include determining and/or establishing survey parameters associated with a web-based survey-of-interest. The disclosed system/method may also include a comparison of the relevant survey parameters to parameters of potential/available survey participants. Still further, the disclosed system/method may include determination of an estimated feasibility of completion of the web-based survey based on the parameters of potential/available survey participants. In exemplary implementations, the survey parameters may be or include generic demographic attributes and/or a desired number of completes.

In yet another aspect, the disclosed system/method may include functionality for estimating survey completion time that involves estimating saturation of web-based surveys. The disclosed saturation functionality may advantageously include determination of an average open surveys value associated with the web-based surveys, e.g., based on previous daily open survey values, determination of a margin associated therewith, and determination of an estimated saturation value based on the average open surveys value and the margin.

In accordance with another aspect of the present disclosure, a non-transitory computer readable medium estimating instruction is disclosed, wherein execution of the instructions by a processing device causes the processing device to implement a system/method for estimating the completion rate of a survey hosted by a web-based survey host site. The instruction may advantageously include functionality for determining parameter completion times for survey parameters associated with the web-based survey based on, inter alia, characteristic values of the web-based survey associated with the survey parameters. The instruction may further include functionality for determining an estimated survey completion time based on parameter completion times.

In a further aspect of the present disclosure, a system for estimating the completion rate of one or more web-based surveys is disclosed. The system generally includes a computer storage device that is adapted to store at least one characteristic associated with one or more web-based surveys. In addition, the system generally includes a processing device configured to determine parameter completion times for survey parameters associated with the web-based survey(s) based on characteristic values of the web-based survey associated with the survey parameters and to determine an estimated survey completion time based on parameter completion times.

Other objects, features and functionalities of the present disclosure will become apparent form the following detailed description considered in conjunction with the accompanying drawings. It is to be understood, however, that the narrative description and drawings are designed as exemplary teachings only and not as a definition of the limits of the present disclosure.

BRIEF DESCRIPTION OF THE DRAWINGS

To assist those of skill in the art in making and using the disclosed systems/methods, reference is made to the accompanying figures, wherein.

DESCRIPTION OF EXEMPLARY EMBODIMENTS

Exemplary embodiments of the present disclosure are directed to estimating the completion rate of online web-based surveys based on one or more survey parameters. A survey feasibility estimator can allow an organization or user wishing to create a new web-based survey to specify survey parameters, determine a panel of active survey participants who would be eligible to participate in the new web-based survey based on the survey parameters, and generate an estimated survey completion rate. The survey feasibility estimator can further determine the feasibility of a new web-based survey and when the survey hosting entity has reached a point of saturation. Feasibility estimators implemented in accordance with the exemplary embodiments can be used to create and implement surveys which will provide the most valuable feedback to the organization or user creating or enlisting such survey, while ensuring that the survey is feasible based on the panel of active survey participants and that the completion rate is acceptable based on the specified survey parameters.

Figure 1:
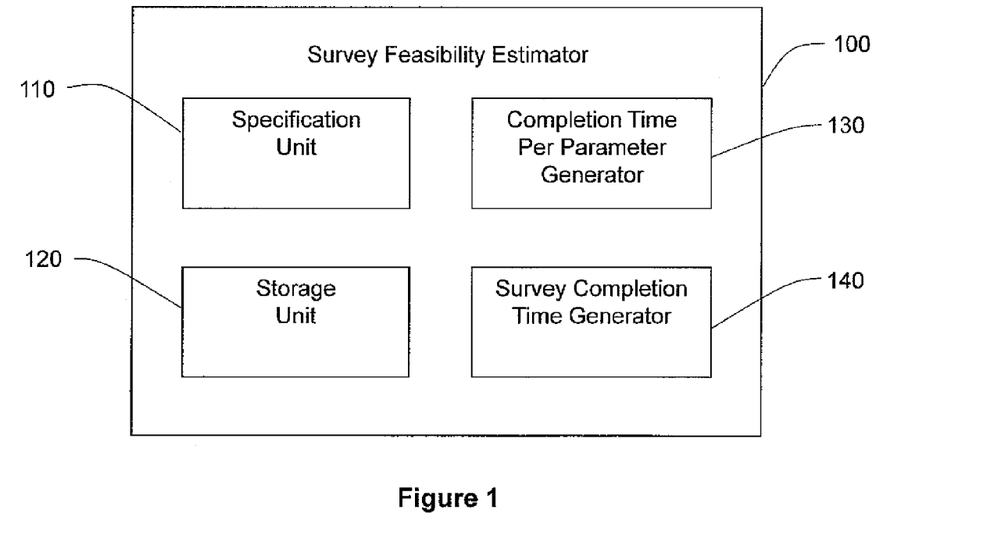
FIG. 1 is a block diagram of an exemplary survey feasibility estimator.

FIG. 1 is a block diagram of an exemplary survey feasibility estimator 100 (hereinafter "feasibility estimator 100"). The feasibility estimator 100 can include a parameter specification unit 110 (hereinafter "specification unit 110"), a parameter storage unit 120 (hereinafter "storage unit 120"), a completion time per parameter generator 130, and a survey completion time generator 140. The feasibility estimator 100 can use survey parameters specified by an organization or user in the specification unit 110 when creating the new web-based survey on the survey hosting entity's site, in comparison with prior survey data stored in the storage unit 120, to calculate completion time rates per parameter using the completion time per parameter generator 130 and thereby obtain the survey completion time by using the survey completion time generator 140.

Figure 2:
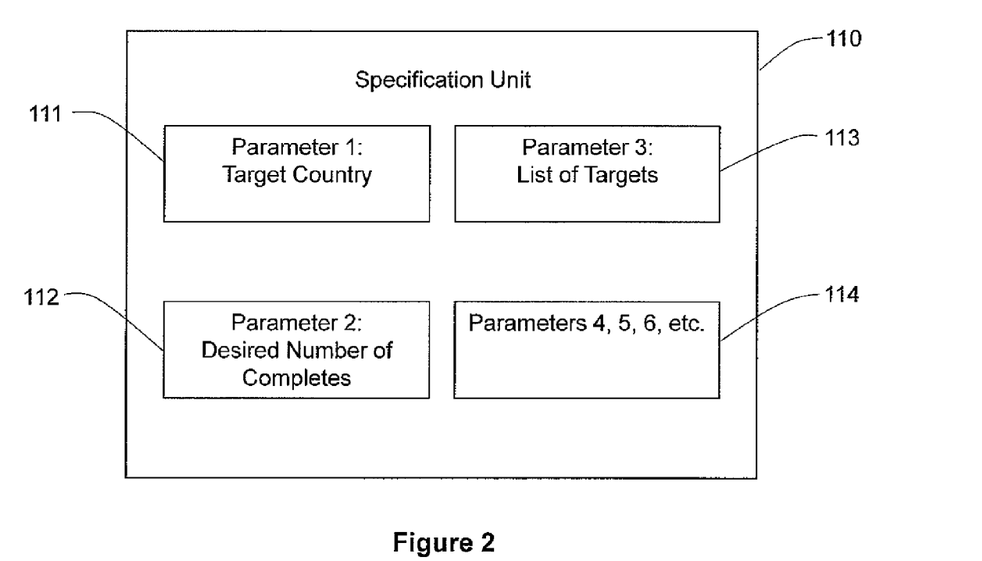
FIG. 2 is a block diagram of an exemplary specification unit.

Turning now to FIG. 2, a block diagram is depicted of an exemplary specification unit 110. The specification unit 110 can be used by a party creating a web-based survey to specify survey parameters. The survey parameters can be specified, for example, to emphasize or deemphasize characteristics associated with surveys and/or respondents. FIG. 2 illustrates exemplary survey parameters. It should be noted that the survey parameters discussed herein are merely examples and, therefore, the present disclosure is not limited to or by such exemplary survey parameters.

The first exemplary survey parameter depicted in FIG. 2 is target country 111. The target country 111 parameter may be used to specify which region survey participants must be from and may be depicted as a country name, e.g., United States, or any other geographic parameter of relevance, e.g., zip code, language speaking characteristic, etc. The second exemplary survey parameter depicted in FIG. 2 is desired number of completes 112. The desired number of completes 112 parameter specifies the number of survey participants who must complete the web-based survey in order to obtain the required feedback (e.g., for statistical purposes) and may be depicted as an integer, e.g., 1,000. The third exemplary survey parameter depicted in FIG. 2 is list of targets 113. The list of targets 113 parameter may be a list of numbers corresponding to a specific quota requested by the organization or user creating the web-based survey.

With reference to the list of targets 113 of FIG. 2, examples are provided herein. The list of targets 113 parameter may be depicted as, for example, "Age, 16-25, 200", where "Age" is the specific parameter of interest, "16-25" is the limitation of the survey parameter specified, and "200" is the limitation of the number of survey participants in the specific parameters of "Age" and "16-25" who must respond to the survey. Thus, based on the prior example, the organization or user creating the web-based survey has specified that one of the parameters associated with the list of targets 113 is that 200 survey participants within the age range of 16 to 25 years old must respond to the survey. An additional example of the list of targets 113 parameter may be "Sex, M, 500", where "Sex" is the specific parameter of interest, "M" is the limitation of the survey parameter specified, and "500" is the limitation of the minimum number of survey participants in the specific parameter of "Sex" and "M" who must respond to the survey. Thus, based on this further example, one of the parameters associated with the list of targets 113 is that 500 survey participants who are males must respond to the survey. The survey parameters specified in the specification unit 110 are not limited to those depicted/illustrated in FIG. 2 and may be implemented individually or in combination. For example, the list of targets 113 may include only one target, e.g., "Age, 16-25, 200", or may include a list of independently required targets, such as "Age, 16-25, 200", "Sex, M, 500", "Sex, F, 400", etc.

In further reference to FIG. 2, and as specified previously, the specification unit 110 may include any number of survey parameters specified by the organization or user creating or enlisting the web-based survey. Thus, although FIG. 2 depicts three survey parameters, target country 111, desired number of completes 112, and list of targets 113, additional parameters 114 may be utilized as desired. Such additional parameters 114 may include, but are not limited to, demographic attributes of survey participants, such as location, income, interests, etc.

Figure 3:
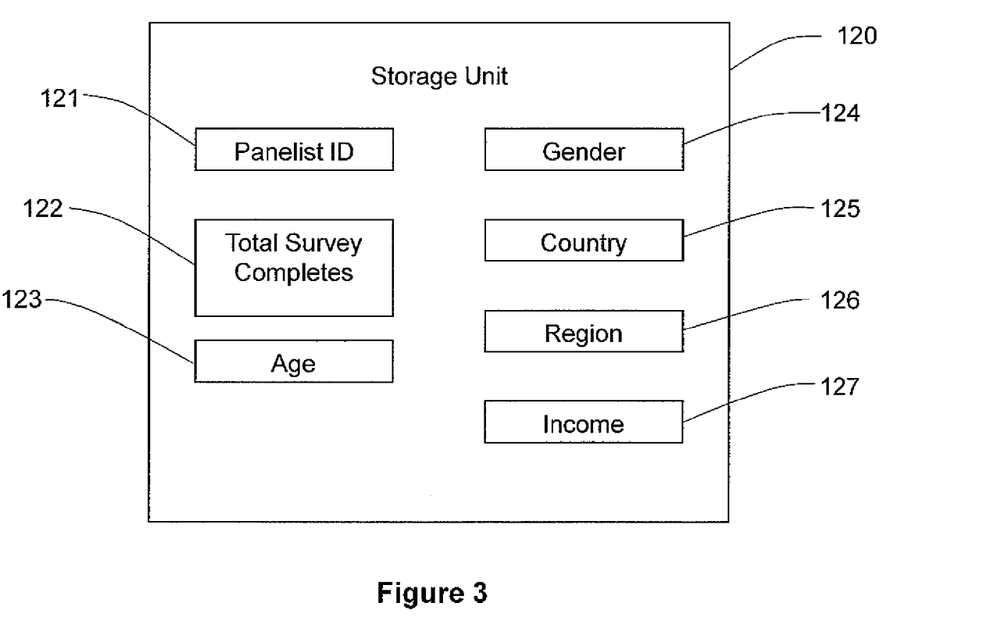
FIG. 3 is a block diagram of an exemplary storage unit.

Turning now to FIG. 3, a block diagram of an exemplary storage unit 120 is depicted. As a survey hosting entity manages and distributes web-based surveys to a variety of survey participants all over the world, the storage unit 120 may be implemented to store specific information about each survey participant. Although not limited to the examples illustrated in FIG. 3, the storage unit 120 may store such information about each survey participant as panelist ID 121, total survey completes 122, age 123, gender 124, country 125, region 126, and income 127. The panelist ID 121 may be a unique identification for each survey participant. The storage unit 120 may be configured as a table, wherein each row of the table corresponds to one panelist ID 121. Further, the storage unit 120 may store panelist information for only those survey participants who have participated in a survey in a specified period of time, e.g., the last six months. Similarly to the specification unit 110 survey parameters, the storage unit 120 may store any information regarding each survey participant available, including, but not limited to, generic demographic attributes. A survey hosting entity may have information on a variety of users. One type of user may be a community member only (hereinafter "CMO"), specifically a user on the survey hosting entity web-site who does not want to take surveys but is willing to give an opinion and play with other parts of the survey hosting entity web-site. Another type of user may be a double opt-in (hereinafter "DOI"), specifically a user who agrees to take surveys and receives invitations for surveys from the survey hosting entity. It should be noted that the storage unit 120 described above should be used to store information on DOI users only, and not CMO users, because DOI user data provides an accurate representation of people who have actually participated in a survey during a predefined period of time. On the other hand, CMO users are not really considered as survey participants, because they have not completed an actual survey within the predefined period of time.

Figure 4:
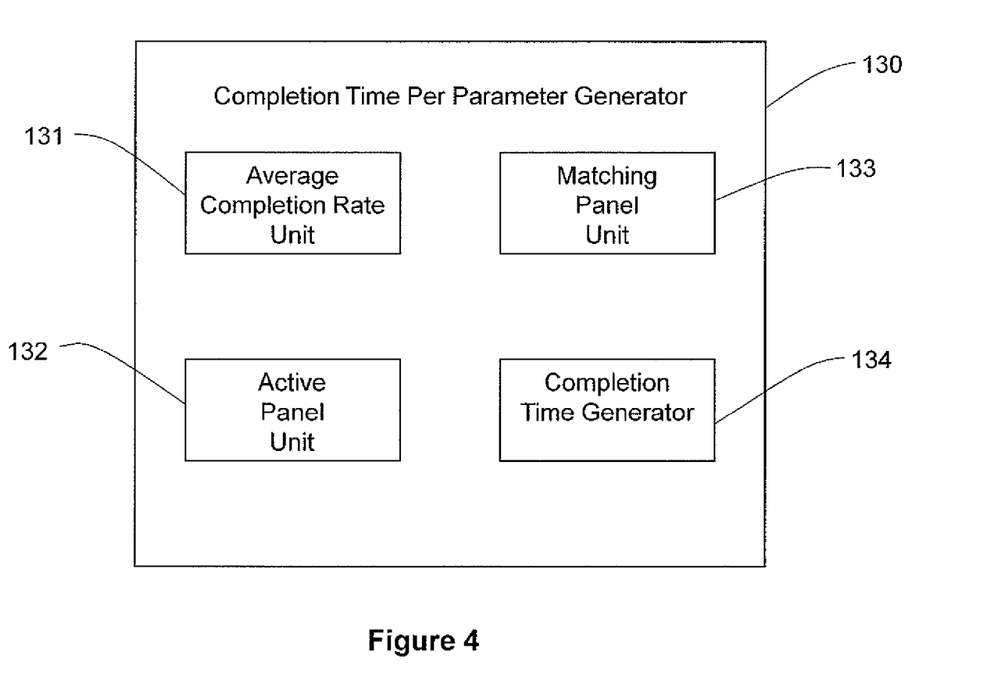
FIG. 4 is a block diagram of an exemplary completion time per parameter generator.

With respect to FIG. 4, a block diagram of an exemplary completion time per parameter generator 130 is illustrated, including the average completion rate unit 131, the active panel unit 132, the matching panel unit 133, and the completion time generator 134. The completion time per parameter generator 130 can gather the relevant information on previous survey participants stored in the storage unit 120 based on the new web-based survey parameters entered into the specification unit 110 and calculates the completion time of surveys specific to each of the survey parameters specified.

The average completion rate unit 131 of FIG. 4 computes the average completion rate (hereinafter "ACR") for an average survey in a given country. Generally, the average completion rate unit 131 can specify an ACR measured in votes per hour. The ACR calculation implemented by the average completion rate unit 131 may be mathematically expressed as follows:

$$ACR(\text{country}) = \left[ \sum_{i=1}^{n} (\text{Size(survey)} \div \text{Time}[\backslash_?]\text{in}[\backslash_?]\text{Field(survey)}) \right] \div n \quad (1)$$

where ACR(country) represents the ACR for an average survey in a given country as computed by the average completion rate unit 131. The Size(survey) represents an integer representing the size of a particular survey, a survey characteristic value provided by the survey hosting entity, Time[\_?]in[\_?]Field(survey) represents the completion time for the particular survey, and n represents the total number of surveys that have been launched during a predefined period of time, e.g., the last six months. Using the formula above, the ACR can be computed by averaging the completion rates for each survey that was active in a specified period of time, e.g., the last six months. Thus, because the ACR provides an average votes per hour for a given survey, by multiplying the ACR value by the desired number of completes, a determination can be made as to the average completion time for a new survey with a specific desired number of completes. For example, a survey of 1,000 desired number of completes on the average will take 1,000×ACR hours in field to complete.

With further reference to FIG. 4, the active panel unit 132, in accordance with the completion time per parameter generator 130, generates an integral value for the number of active panelists or survey participants for a country for a predefined period of time, e.g., the last six months. Similarly to the discussion above of survey participants with respect to storage unit 120, the active panel unit 132 only generates an integral value for the number of DOI active panelists or survey participants for a country for a predefined period of time. Specifically, the DOI value of active panelists determined by the active panel unit 132 is defined by the total number of panelists that voted or participated on at least one survey during a predefined period of time, e.g., the last six months. An exemplary method of calculating the value of active panelists may be performed by, but is not limited to, a determination of all surveys completed during the predefined period of time and a count for each country giving the number of active survey participants who participated in the surveys completed during the predefined period of time. Thus, for example, if 1,000 surveys were completed by 600 survey participants in the last six months in the United States, the active panel for the United States would be 600 survey participants.

The matching panel unit 133 of the completion time per parameter generator 130 is depicted in FIG. 4, which determines the size of the panel of survey participants that match all of the targets specified as survey parameters in the specification unit 110. The purpose of the matching panel unit 133 is to determine whether the survey hosting entity contains a sufficient amount of survey participants with parameters which match those specified in the specification unit 110. Thus, the matching panel unit 133 may scan the information stored in storage unit 120 to determine if survey participants active within a predefined period of time, e.g., the last six months, have matching attributes or parameters to those specified in the specification unit 110 and would be eligible to take the new web-based survey. The matching panel unit 133 may run a query of the storage unit 120 using a function with a "where condition" for each target, thereby computing the number of panelists that match the target criteria from within the storage unit 120.

A further component of the exemplary completion time per parameter generator 130 is the completion time generator 134, as shown in FIG. 4. The completion time generator 134 may estimate the completion rate of a survey for any given quota or parameter value as specified by the survey parameters in the specification unit 110. Mathematically, the completion time per parameter generator 130 determination may be shown as follows:

$$\text{EstimatedRate(TargetCountry, NumberOfCompletes, Target, ... )} = \text{CompletionTime} \quad (2)$$

where EstimatedRate is a function of survey parameters entered in the specification unit 110, such as TargetCountry, NumberOfCompletes, and Target, and where CompletionTime is the completion time per survey parameter. Hence, the EstimatedRate and CompletionTime is an integer showing the number of days to complete a survey, the TargetCountry is a country, the NumberOfCompletes is an integer specifying the desired number of completes, and Target is an integer corresponding to a specific survey parameter. For example, a Target may be "Age, 16-25, 200" or "Sex, M, 500", as discussed previously.

Further, with respect to FIG. 4, the completion time per parameter generator 130 method of computation may be mathematically depicted as follows:

$$\text{EstimatedRate} = \text{ACR} \times (\text{Matching}[\backslash_?]\text{Panel} \div \text{ActivePanel}) \quad (3)$$

where EstimatedRate is the completion time per parameter, ACR is the average completion rate for an average survey in a given country computed by the average completion rate unit 131, ActivePanel is the active panel of survey participants for the country for a predefined period of time computed by the active panel unit 132, and Matching[\_?]Panel is the matching panel of survey participants as computed by the matching panel unit 133. Thus, the completion time per parameter generator 130 utilizes the values computed by the average completion rate unit 131, the active panel unit 132 and the matching panel unit 133 to calculate the estimated rate of completion for each specified survey parameter of the specification unit 110.

With reference to FIG. 1, the last component of the feasibility estimator 100 is the survey completion time generator 140, which compares the estimated rates of completion per survey parameter determined by the completion time per parameter generator 130 and selects the slowest estimated rate of completion. For example, an organization or user may specify survey parameters in the specification unit 110 as "600 Males, 400 Females" and "200 below 30, 300 between 30 and 40, 500 over 40". These values represent that 1,000 total desired number of completes are required, 600 of which are males and 400 are females, and a further specification that 200 of the survey respondents must be below the age of 30, 300 must be between the ages of 30 and 40, and 500 must be over the age of 40. Thus, the completion time per parameter generator 130 can compute the estimated rate of completion for each of the survey parameters, i.e., 600 males, 400 females, 200 below 30, 300 between 30 and 40, and 500 over 40, based on the ACR, active panel and matching panel for the given survey. Based on the estimated rates of completion for each survey parameter, the survey completion time generator 140 will generally select the slowest estimated rate of completion for a survey parameter, because this value represents the survey parameter which it will take longest to fulfill based on the specified survey parameters entered into the specification unit 110.

Figure 5:
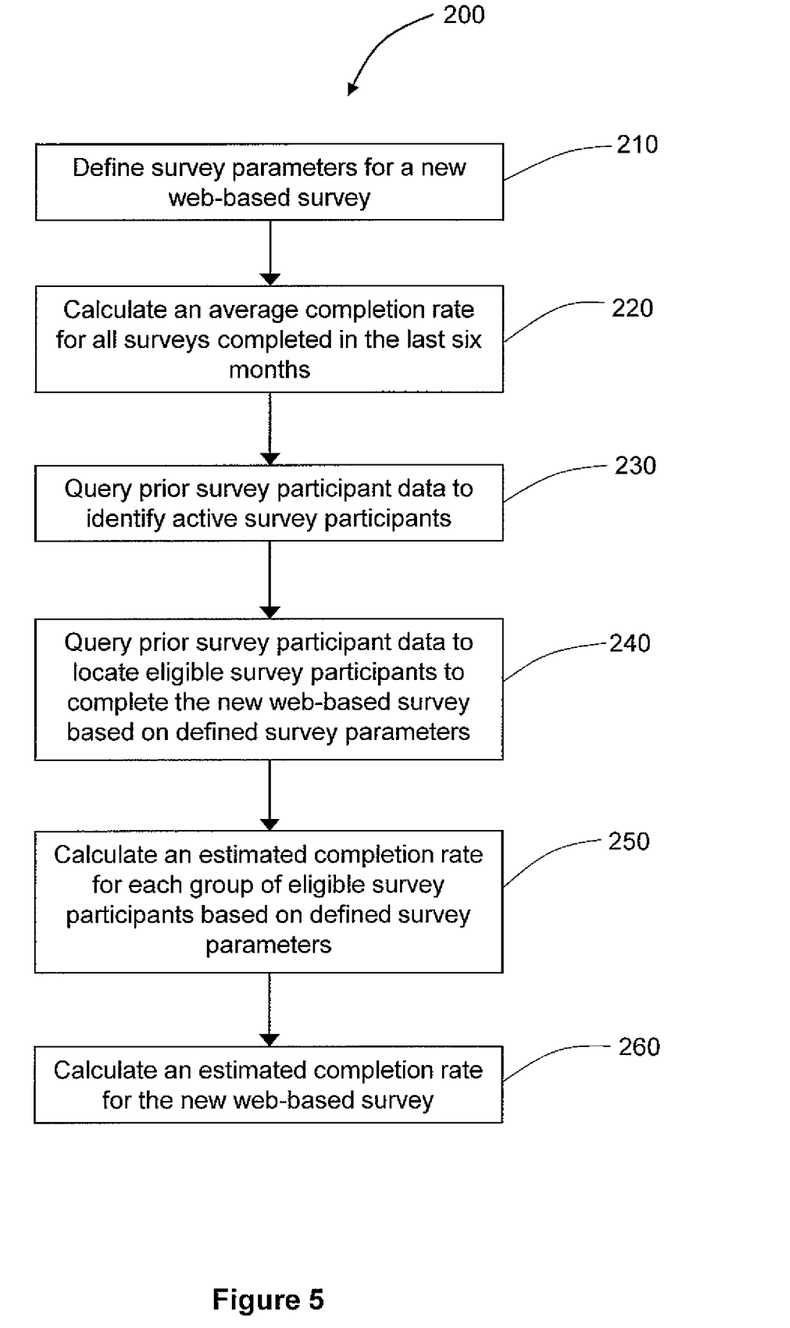
FIG. 5 is a flowchart illustrating estimation of the completion time of a survey using the disclosed survey feasibility estimator.

FIG. 5 is a flowchart illustrating an exemplary estimation of a completion time of a web-based survey hosted by a survey hosting site using the feasibility estimator 100. To begin, survey parameters must be defined in the specification unit 110 for the new web-based survey (210). Based on the data stored in storage unit 120, the average completion rate unit 131 must then calculate an average completion rate for all surveys completed in a predefined period of time, e.g., the last six months (220). The active panel unit 132 then queries prior survey participant data to identify active survey participants (230). As stated before, the active survey participants are determined from DOI users only. Next, the matching panel unit 133 queries the prior survey participant data to locate eligible survey participants to complete the new web-based survey based on survey parameters defined in the specification unit 110 (240). The completion time generator 134 of the completion time per parameter generator 130 then calculates an estimated completion rate for each group of eligible survey participants based on survey parameters defined in the specification unit 110 (250). The survey completion time generator 140 calculates an estimated completion rate for the new web-based survey based on the estimated completion rates for each group of eligible survey participants (260).

Figure 6:
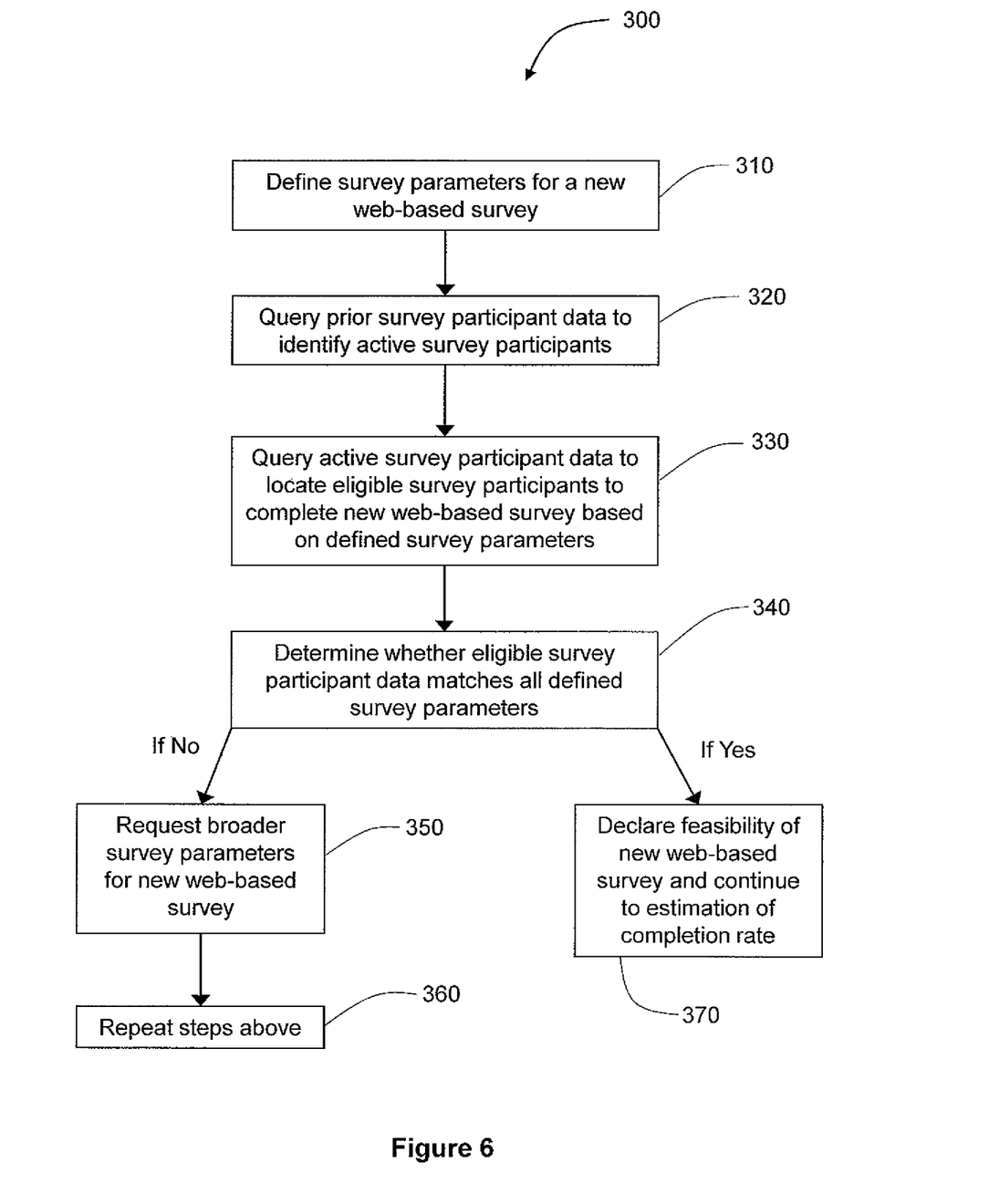
FIG. 6 is a flowchart illustrating determination of the feasibility of a survey using the disclosed survey feasibility estimator.

In a further exemplary embodiment of the feasibility estimator 100, a feasibility generator 300 may be implemented, as depicted in the flowchart of FIG. 6. The feasibility generator 300 may determine the feasibility of a web-based survey by determining the survey parameters associated with the web-based survey, comparing the survey parameters to parameters of survey participants, and determining the estimated feasibility of the web-based survey based on the parameters of survey participants. Specifically, survey parameters are first defined for a new web-based survey in the specification unit 110 (310). The active panel unit 132 queries prior survey participant data in the storage unit 120 to identify active survey participants (320). Next, the matching panel unit 133 queries active survey participant data to locate eligible survey participants to complete the new web-based survey based on defined survey parameters (330). A determination is then made whether eligible survey participant data matches all the defined survey parameters and whether such eligible survey participants are sufficient in number to fulfill the specified desired number of completes for the survey (340). If the number of eligible survey participants is sufficient to fulfill the desired number of completes for a survey, the feasibility generator 300 may declare the feasibility of the new web-based survey and continue to the feasibility estimator 100 to estimate the completion rate of the survey (370). However, if the number of eligible survey participants is insufficient to fulfill the desired number of completes for a survey, the feasibility generator 300 may request that broader survey parameters for the new web-based survey be entered (350). Therefore, once new survey parameters are entered, the steps of the feasibility generator 300 may be repeated to determine whether the new number of eligible survey participants is not sufficient to fulfill the desired number of completes in accordance with the survey parameters specified (360). The feasibility generator 300 ensures that the active survey participants associated with the survey hosting entity will be sufficient to fulfill the desired number of completes for the survey, as well as meeting the specified survey parameters indicated in the specification unit 110.

Figure 7:
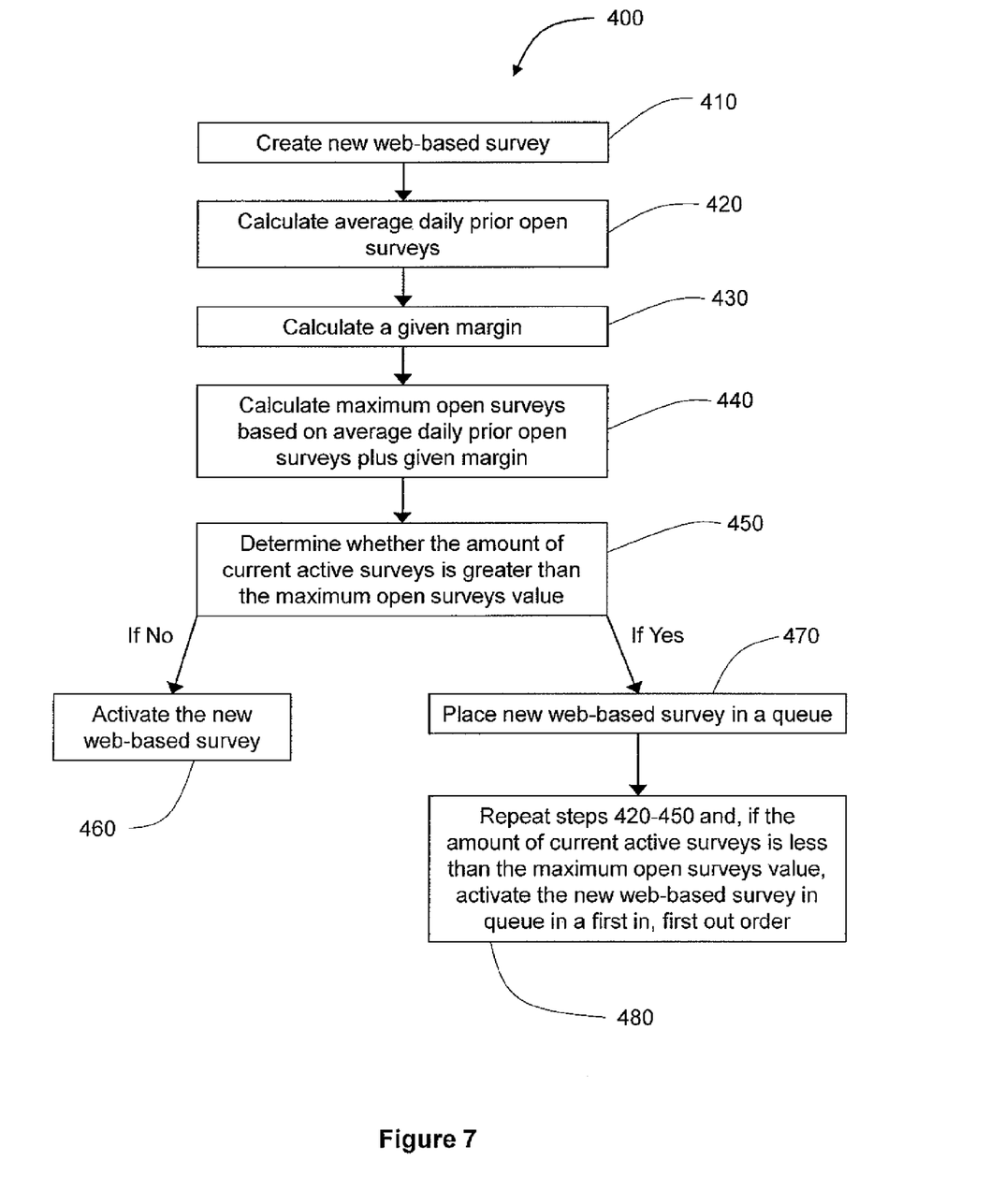
FIG. 7 is a flowchart illustrating determination of a saturation of surveys using the disclosed survey feasibility estimator.

In another exemplary embodiment of the present disclosure, a saturation generator 400 may be implemented, as depicted in the flowchart of FIG. 7. The saturation generator 400 may estimate the saturation of web-based surveys by determining an average open surveys value associated with the web-based surveys based on previous daily open survey values, determining a margin, and determining an estimated saturation value based on the average open surveys value and the margin. Thus, the saturation generator 400 issues a saturation estimate which allows the survey hosting entity to determine whether it has reached a saturation for a given country in the number of active surveys it can host and, if so, cannot accept any more surveys. Specifically, with respect to FIG. 7, once a new web-based survey is created (410), an average daily open survey value is calculated for a predefined period of time, e.g., the last six months (420). A given margin is also calculated as a form of standard deviation from the average daily open surveys value (430). Next, the maximum open surveys value is calculated based on the average daily prior open surveys plus the given margin (440). Mathematically, the implementation of the saturation generator 400 may be depicted as follows:

$$MaxOpenSurveys = AverageOpenSurveys + 2Sigma \quad (3)$$

where AverageOpenSurveys is the average daily open surveys value, 2Sigma is the standard deviation or given margin, and MaxOpenSurveys is the maximum number of surveys which may be active at one time on the survey hosting entity site before reaching a saturation level. Thus, the saturation generator 400 limits the total number of open surveys on any given day to the daily average of open surveys in a predefined period, e.g., the last six months, plus a given margin. The storage unit 120 of FIG. 1 may be utilized to store such information as the daily value of open surveys in a predefined period of time, the average daily open surveys value for a predefined period of time, as well as the standard deviation of such values.

In further reference to FIG. 7, once a maximum open surveys value or saturation value is calculated, a determination is made whether the amount of currently active surveys is greater than the maximum open surveys value (450). If the amount of currently active surveys is below the saturation value, the new web-based survey may be activated (460). However, if the amount of currently active surveys is above or equal to the saturation value, the new web-based survey may be delayed and placed in a queue (470). The steps of 420 to 450 may then be repeated upon a passing of a predetermined period of time, e.g., hourly, daily, etc., and if the amount of current active surveys is found to be less than the saturation level, the new web-based survey in queue may be activated (480). It should be noted that the examination of web-based surveys in queue should be made in a first in, first out (hereinafter "FIFO") order.

Figure 8:
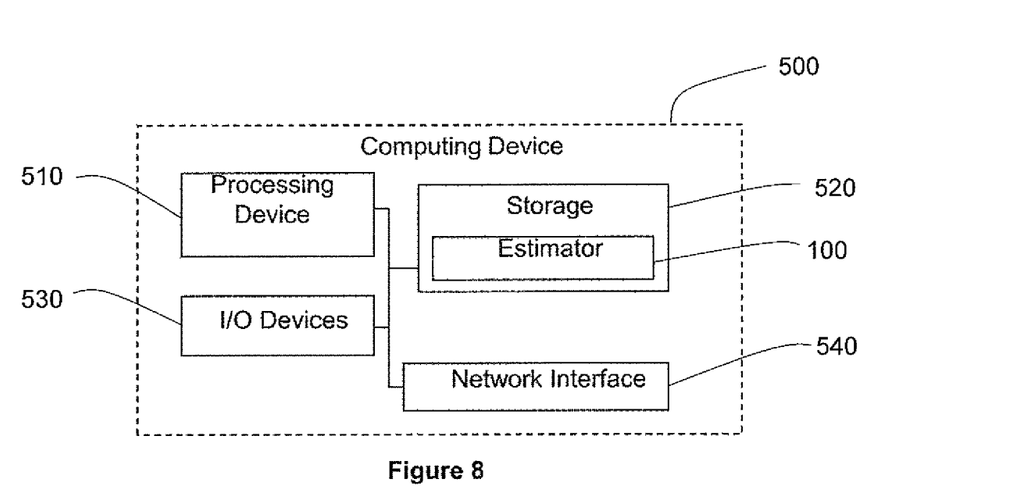
FIG. 8 is a block diagram of an exemplary computing device configured to implement embodiments of a survey feasibility estimator.

Now with reference to FIG. 8, a block diagram of an exemplary computing device 500 configured to implement embodiments of the feasibility estimator 100 is depicted. The computing device 500 can be a mainframe, personal computer (PC), laptop computer, workstation, server, handheld device, such as a portable digital assistant (PDA), and the like. In the illustrated embodiment, the computing device 500 includes a processing device 510, such as a central processing device, and can include a computer storage device 520 (hereinafter "storage 520"). The computing device 500 can further include input/output devices 530, such as a display device, keyboard, touch screen, mouse, printer, and the like, and can include a network interface 540 to facilitate communication between the computing device 500 and other devices communicative coupled to a network.

The storage 520 stores data and instructions and can be implemented using non-transitory computer readable medium technologies, such as a floppy drive, hard drive, tape drive, Flash drive, optical drive, read only memory (ROM), random access memory (RAM), and the like. For example, the storage 520 can store survey parameters, survey participant characteristics or parameters, active panel values, matching panel values, and the like, generated or used by the feasibility estimator 100. Applications, such as an embodiment of the feasibility estimator 100, or portions thereof, can be resident in the storage 520 and can include instructions for implementing the applications. The storage 520 can be local or remote to the computing device 500. The processing device 510 operates to run the applications in storage 520, such as the feasibility estimator 100, by executing instructions therein and storing data resulting from the executed instructions, such as active panelists, which may be presented to a user.

Figure 9:
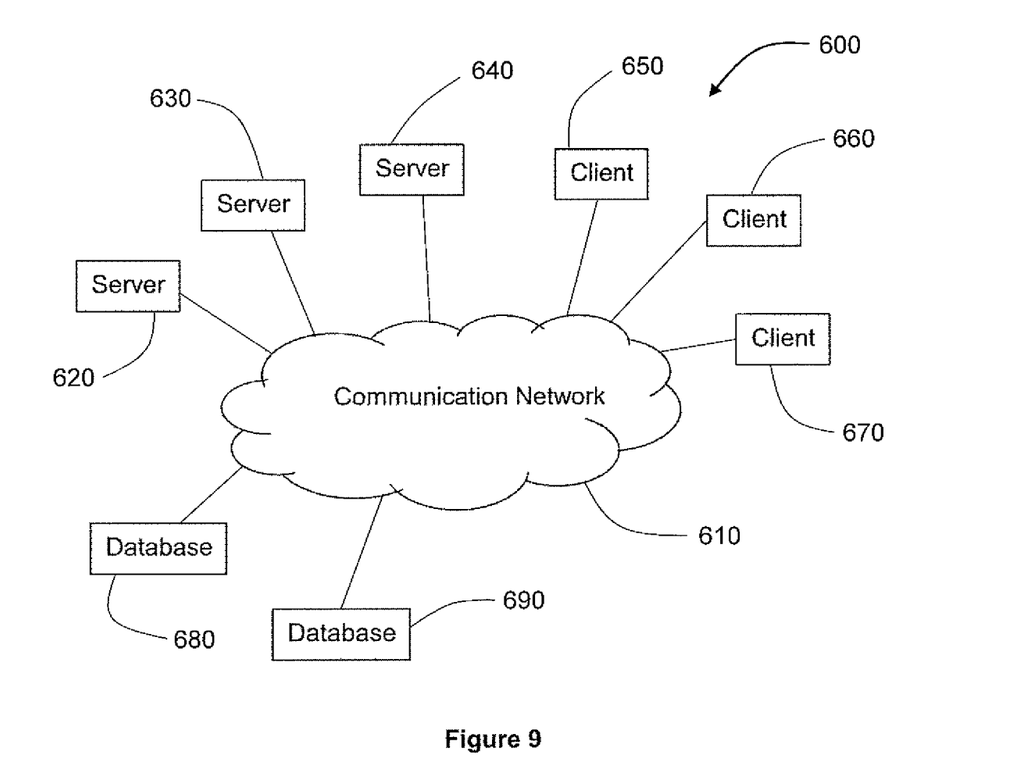
FIG. 9 is a schematic illustration of a computing system for implementing embodiments of a disclosed survey feasibility estimator.

With reference to FIG. 9, a block diagram of an exemplary computing system 600 configured to implement one or more embodiments of the feasibility estimator 100 is depicted. The computing system 600 includes servers 620, 630 and 640, operatively coupled to clients 650, 660, and 670, via a communication network 610, which can be any network over which information can be transmitted between devices communicatively coupled to the network. For example, the communication network 610 can be the Internet, Intranet, virtual private network (VPN), wide area network (WAN), local area network (LAN), and the like. The computing system 600 can include repositories or database devices 680 and 690, which can be operatively coupled to the servers 620, 630 and 640, as well as to clients 650, 660 and 670, via the communications network 610. The servers 620, 630 and 640, clients 650, 660 and 670, and database devices 680 and 690 can be implemented as computing devices. Those skilled in the art will recognize that the database devices 680 and 690 can be incorporated into one or more of the servers 620, 630 and 640, such that one or more of the servers can include databases.

In exemplary embodiments, the feasibility estimator 100 can be distributed among different devices, e.g., servers, clients, databases, in the communication network 610 such that one or more components of the feasibility estimator 100, or portions thereof, can be implemented by different devices in the communication network 610. For example, in illustrative embodiments, the specification unit 110 can be implemented by the server 620, and the storage unit 120, completion time per parameter generator 130 and survey completion time generator 140 can be implemented by the server 630.

In an exemplary embodiment, servers 620, 630 and 640 can be web servers configured to host web pages. Server 620 can be configured to implement the feasibility estimator 100 and servers 630 and 640 can be configured to host surveys for a survey hosting site. Client 650 can represent the surveying entity and clients 660 and 670 can represent survey participants. The database devices 680 and 690 can be configured to store survey parameters, survey participant characteristics or parameters, active panel values, matching panel values, and the like. In an exemplary operation, the survey participants can access and respond to the survey hosted by the servers 620, 630 and 640 using a web browser implemented by the client devices.

Although the present disclosure has been described with reference to exemplary embodiments and implementations, it is to be understood that the present disclosure is neither limited by nor restricted to such exemplary embodiments and/or implementations. Rather, the present disclosure is susceptible to various modifications, enhancements and variations without departing from the spirit or scope of the present disclosure. Indeed, the present disclosure expressly encompasses such modifications, enhancements and variations as will be readily apparent to persons skilled in the art from the disclosure herein contained.

The invention claimed is:

1. A method of estimating a completion rate of a web-based survey, comprising:
   determining parameter completion times for survey parameters associated with the web-based survey based on characteristic values of the web-based survey associated with the survey parameters; and
   determining an estimated survey completion time based on the parameter completion times,
   wherein the parameter completion times and the estimated survey completion time are determined prior to issuance of the web-based survey to survey participants; and
   wherein determining an estimated survey completion time further comprises estimating a saturation of web-based surveys by (i) determining an average open surveys value associated with the web-based surveys based on previous daily open survey values; (ii) determining a margin; and (iii) determining an estimated saturation value based on the average open surveys value and the margin.

2. The method of claim 1, wherein the estimated survey completion time is equal to the longest parameter completion time.

3. The method of claim 1, wherein the survey parameters are generic demographic attributes.

4. The method of claim 3, wherein the survey parameters are a desired number of completes.

5. The method of claim 3, wherein the generic demographic attributes are survey participant location, age, gender and income.

6. The method of claim 1, wherein the characteristic values further comprise values for an average completion rate, an active panel, and a matching panel.

7. The method of claim 6, wherein the average completion rate is measured in votes per hour.

8. The method of claim 6, wherein the average completion rate comprises an average completion rate for an average survey in a given country.

9. The method of claim 6, wherein the active panel comprises a total number of survey participants who voted on at least one survey during a predefined period of time.

10. The method of claim 6, wherein the matching panel comprises a panel which matches the survey parameters.

11. The method of claim 1, further comprising estimating the feasibility of the web-based survey by
   determining the survey parameters associated with the web-based survey;
   comparing the survey parameters to parameters of survey participants; and
   determining an estimated feasibility of the web-based survey based on the parameters of survey participants.

12. A non-transitory computer readable medium estimating instruction, wherein execution of the instructions by a processing device causes the processing device to implement a method for estimating a completion rate of a survey hosted by a web-based survey host site, comprising:
   determining parameter completion times for survey parameters associated with the web-based survey based on characteristic values of the web-based survey associated with the survey parameters; and
   determining an estimated survey completion time based on the parameter completion times,
   wherein the parameter completion times and the estimated survey completion time are determined prior to issuance of the web-based survey to survey participants; and
   wherein determining an estimated survey completion time further comprises estimating a saturation of web-based surveys by (i) determining an average open surveys value associated with the web-based surveys based on previous daily open survey values; (ii) determining a margin; and (iii) determining an estimated saturation value based on the average open surveys value and the margin.

13. A system for estimating a completion rate of a web-based survey, comprising:
   a computer storage device storing a characteristic associated with the web-based survey;
   a processing device configured to determine parameter completion times for survey parameters associated with the web-based survey based on characteristic values of the web-based survey associated with the survey parameters and to determine an estimated survey completion time based on the parameter completion times, wherein the parameter completion times and the estimated survey completion time are determined prior to issuance of the web-based survey to survey participants; and
   wherein determining an estimated survey completion time further comprises estimating a saturation of web-based surveys by (i) determining an average open surveys value associated with the web-based surveys based on previous daily open survey values; (ii) determining a margin; and (iii) determining an estimated saturation value based on the average open surveys value and the margin.

* * * * *